US012580726B2

(12) United States Patent
Chengalroyen et al.

(10) Patent No.: US 12,580,726 B2
(45) Date of Patent: Mar. 17, 2026

(54) USING A SINGLE AES KEY TO ENCRYPT PKCS #7 FILES

(71) Applicant: DigiCert, Inc., Lehi, UT (US)

(72) Inventors: Jarryd Chengalroyen, Cape Town (CA); Darin Scott Andrew, Lehi, UT (US)

(73) Assignee: DigiCert, Inc., Lehi, UT (US)

( * ) Notice: Subject to any disclaimer, the term of this patent is extended or adjusted under 35 U.S.C. 154(b) by 215 days.

(21) Appl. No.: 18/485,480

(22) Filed: Oct. 12, 2023

(65) Prior Publication Data

US 2025/0125950 A1    Apr. 17, 2025

(51) Int. Cl.
*H04L 9/00*    (2022.01)
*H04L 9/08*    (2006.01)
*H04L 9/32*    (2006.01)

(52) U.S. Cl.
CPC ............ *H04L 9/006* (2013.01); *H04L 9/0861* (2013.01); *H04L 9/0891* (2013.01); *H04L 9/3268* (2013.01)

(58) Field of Classification Search
CPC ...................................................... H04L 9/006
See application file for complete search history.

(56) References Cited

U.S. PATENT DOCUMENTS

| | | | |
|---|---|---|---|
| 9,166,970 B1 | 10/2015 | Dundas et al. | |
| 9,350,536 B2 | 5/2016 | Sabin | |
| 9,769,046 B2 | 9/2017 | Sabin | |
| 10,250,397 B1 | 4/2019 | Singal et al. | |
| 10,341,321 B2 | 7/2019 | Kumar et al. | |
| 10,505,920 B2 | 12/2019 | Kumar et al. | |
| 10,764,040 B2 | 9/2020 | Kumar et al. | |
| 10,778,448 B2 | 9/2020 | Modi et al. | |
| 10,958,437 B2 | 3/2021 | Sabin | |
| 11,206,134 B2 | 12/2021 | Kumar et al. | |
| 11,604,659 B2 | 3/2023 | Naik | |
| 12,184,792 B1 * | 12/2024 | Stapleton | .............. H04L 9/3268 |
| 2002/0116610 A1 * | 8/2002 | Holmes | ................. H04L 9/3263 |
| | | | 713/181 |
| 2013/0318353 A1 | 11/2013 | Skarda | |
| 2016/0365985 A1 | 12/2016 | Pilcher et al. | |
| 2018/0234256 A1 * | 8/2018 | Bowen | ................ H04L 63/0823 |
| 2019/0123915 A1 * | 4/2019 | Simplicio, Jr. | ..... H04L 63/0823 |
| 2021/0056198 A1 | 2/2021 | Choules et al. | |
| 2022/0150238 A1 | 5/2022 | Bhalerao | |
| 2022/0398322 A1 | 12/2022 | Kumar et al. | |
| 2023/0065060 A1 | 3/2023 | Kumar et al. | |
| 2023/0208652 A1 | 6/2023 | Kumar et al. | |

\* cited by examiner

*Primary Examiner* — Bradley W Holder
(74) *Attorney, Agent, or Firm* — Baratta Law PLLC; Lawrence A. Baratta, Jr.

(57) ABSTRACT

Cryptographic systems and methods are provided. A method, according to one implementation, includes a step of generating a plurality of key pairs in response to receiving a request from a client for one or more digital certificates. The key pairs are associated respectively with the one or more digital certificates. Also, each key pair includes a public key and a private key. The method further includes a step of utilizing at least the plurality of key pairs to generate the one or more digital certificates. Also, the method includes a step of encrypting the one or more digital certificates and respective private keys using a single Advanced Encryption Standard (AES) key. The method also includes a step of sending the encrypted one or more digital certificates and private keys back to the client.

13 Claims, 5 Drawing Sheets

SERVER *14*

④ encryption ← certificate ← certificate

③

④

TRUST MANAGER *24* ② → public key / private key → CERTIFICATE MANAGEMENT SYSTEM *26*

- public key
- private key

⑤  ①

CLIENT PREMISES *12*

16

DATA BASE *18*

⑧

⑥

HARDWARE SECURITY MODULE *20* → ⑦ →  AES KEY

*10*

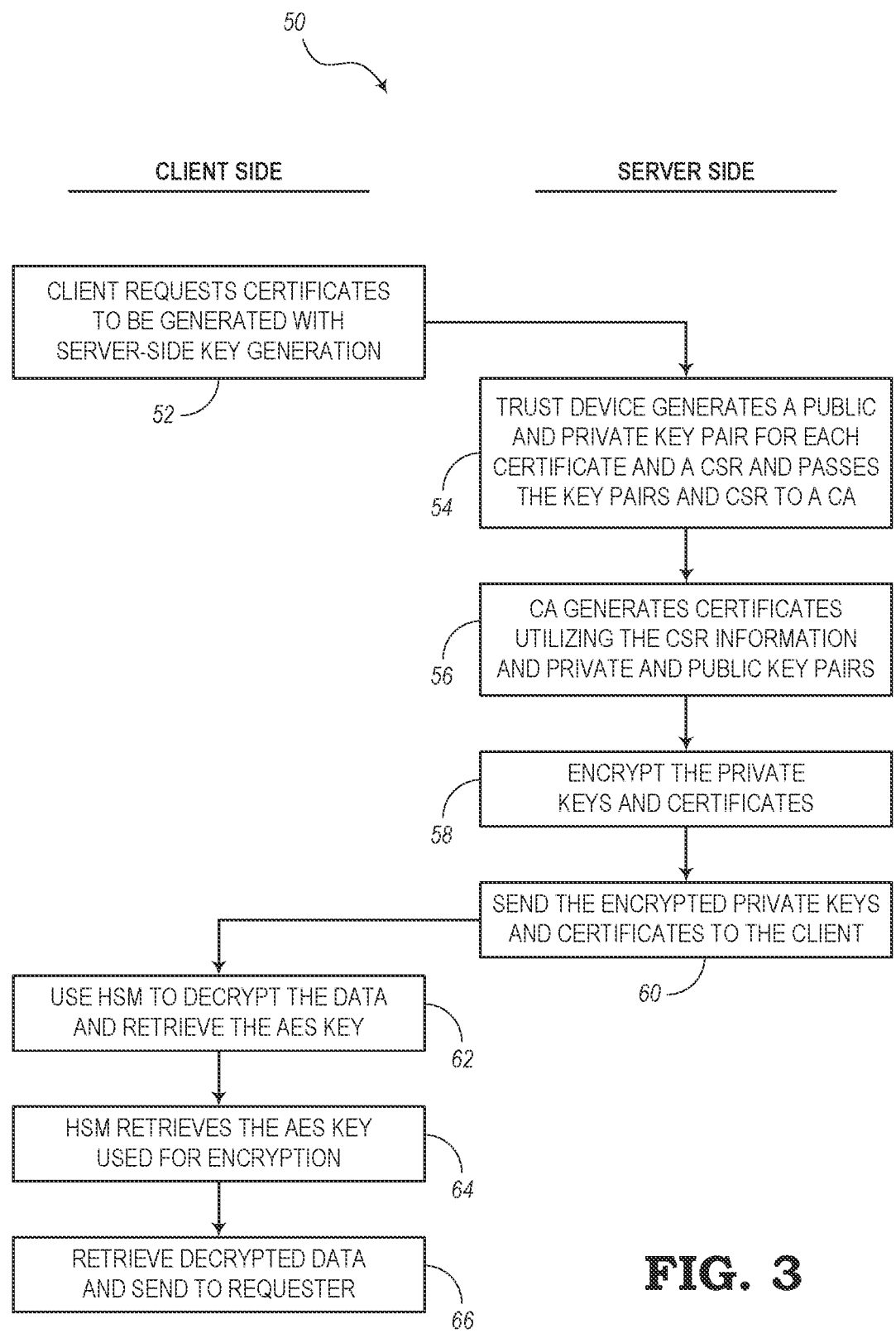

_50_

CLIENT SIDE

SERVER SIDE

CLIENT REQUESTS CERTIFICATES
TO BE GENERATED WITH
SERVER-SIDE KEY GENERATION

_52_

TRUST DEVICE GENERATES A PUBLIC
AND PRIVATE KEY PAIR FOR EACH
CERTIFICATE AND A CSR AND PASSES
THE KEY PAIRS AND CSR TO A CA

_54_

CA GENERATES CERTIFICATES
UTILIZING THE CSR INFORMATION
AND PRIVATE AND PUBLIC KEY PAIRS

_56_

ENCRYPT THE PRIVATE
KEYS AND CERTIFICATES

_58_

SEND THE ENCRYPTED PRIVATE KEYS
AND CERTIFICATES TO THE CLIENT

_60_

USE HSM TO DECRYPT THE DATA
AND RETRIEVE THE AES KEY

_62_

HSM RETRIEVES THE AES KEY
USED FOR ENCRYPTION

_64_

RETRIEVE DECRYPTED DATA
AND SEND TO REQUESTER

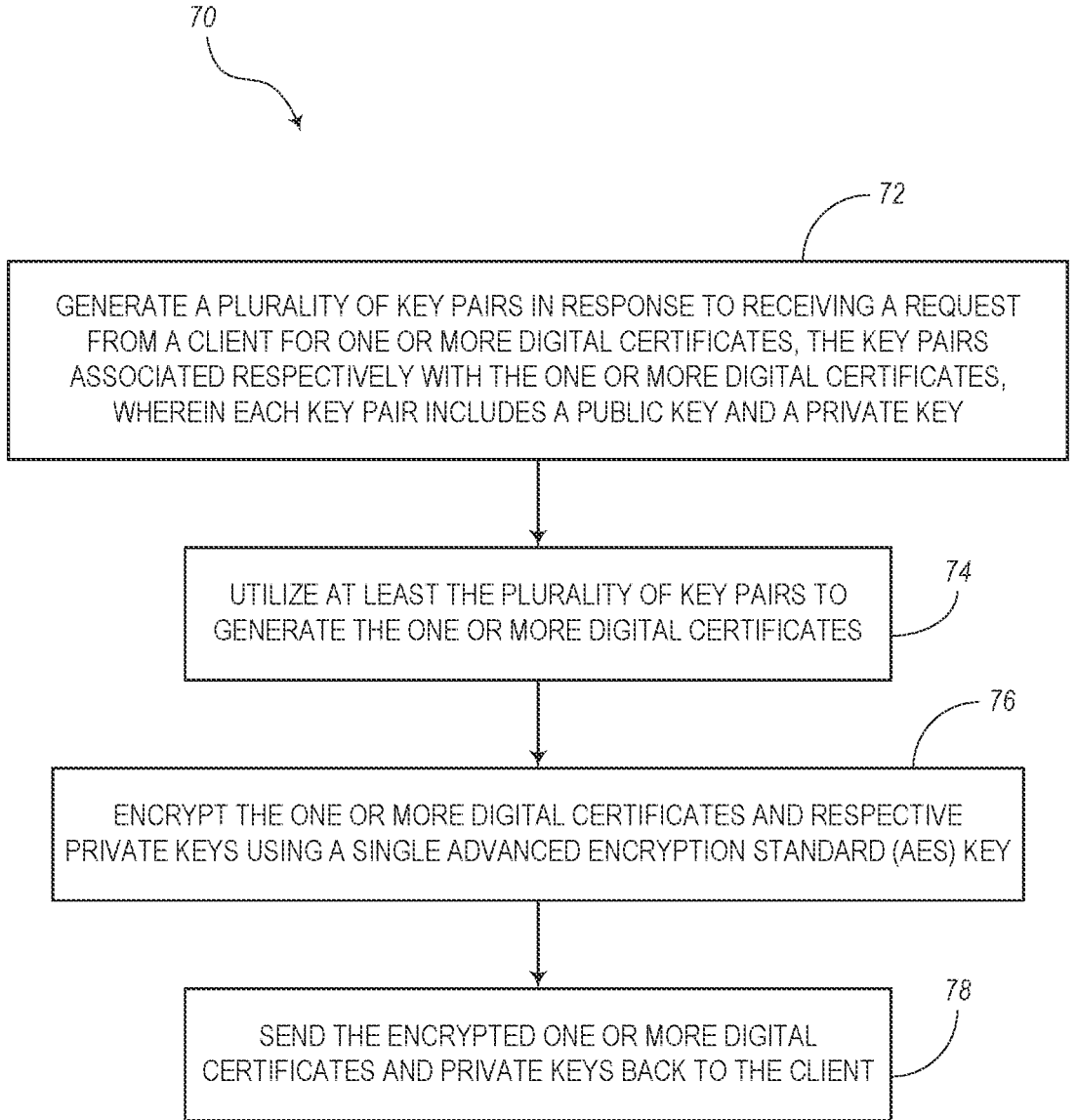

70

72

GENERATE A PLURALITY OF KEY PAIRS IN RESPONSE TO RECEIVING A REQUEST FROM A CLIENT FOR ONE OR MORE DIGITAL CERTIFICATES, THE KEY PAIRS ASSOCIATED RESPECTIVELY WITH THE ONE OR MORE DIGITAL CERTIFICATES, WHEREIN EACH KEY PAIR INCLUDES A PUBLIC KEY AND A PRIVATE KEY

74

UTILIZE AT LEAST THE PLURALITY OF KEY PAIRS TO GENERATE THE ONE OR MORE DIGITAL CERTIFICATES

76

ENCRYPT THE ONE OR MORE DIGITAL CERTIFICATES AND RESPECTIVE PRIVATE KEYS USING A SINGLE ADVANCED ENCRYPTION STANDARD (AES) KEY

78

SEND THE ENCRYPTED ONE OR MORE DIGITAL CERTIFICATES AND PRIVATE KEYS BACK TO THE CLIENT

FIG. 4

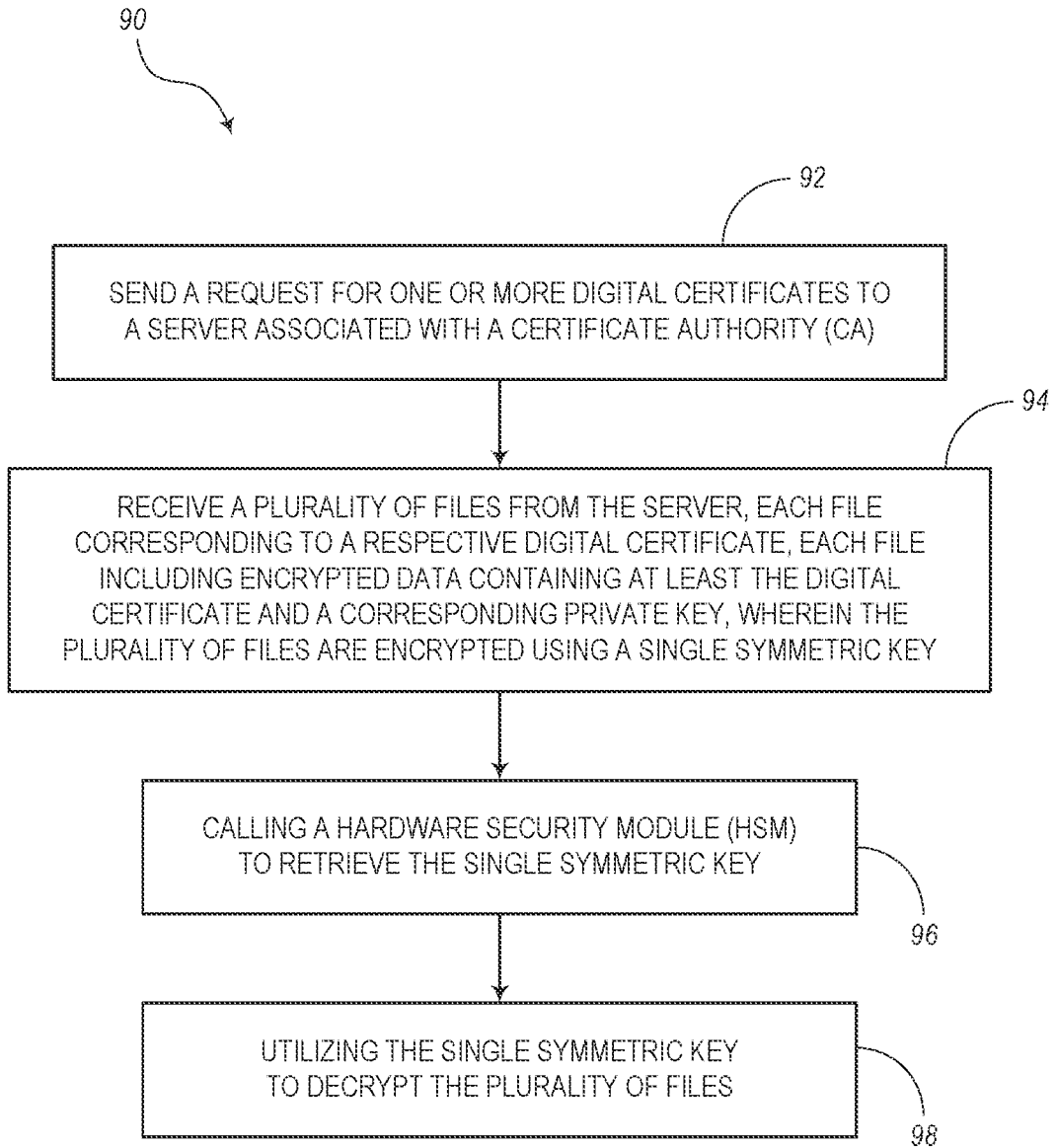

*90*

*92*

SEND A REQUEST FOR ONE OR MORE DIGITAL CERTIFICATES TO A SERVER ASSOCIATED WITH A CERTIFICATE AUTHORITY (CA)

*94*

RECEIVE A PLURALITY OF FILES FROM THE SERVER, EACH FILE CORRESPONDING TO A RESPECTIVE DIGITAL CERTIFICATE, EACH FILE INCLUDING ENCRYPTED DATA CONTAINING AT LEAST THE DIGITAL CERTIFICATE AND A CORRESPONDING PRIVATE KEY, WHEREIN THE PLURALITY OF FILES ARE ENCRYPTED USING A SINGLE SYMMETRIC KEY

CALLING A HARDWARE SECURITY MODULE (HSM) TO RETRIEVE THE SINGLE SYMMETRIC KEY

*96*

UTILIZING THE SINGLE SYMMETRIC KEY TO DECRYPT THE PLURALITY OF FILES

USING A SINGLE AES KEY TO ENCRYPT PKCS #7 FILES

TECHNICAL FIELD

The present disclosure generally relates to cryptography systems and methods. More particularly, the present disclosure relates to using a single Advanced Encryption Standard (AES) key to encrypt Public-Key Cryptography Standard 7 (PKCS #7) files that store and transport encrypted certificates.

BACKGROUND

In the field of cryptography, a series of Public-Key Cryptography Standards (PKCS) have been created. For instance, the standard "PKCS #7," also referred to as Cryptographic Message Syntax (CMS), defines a syntax for storing and transporting encrypted data. Also, PKCS #7 defines data packaging for the distribution of one or more digital certificates that have been issued by a Certificate Authority (CA) to identify and authenticate users, electronic devices, websites, etc. Therefore, instead of transporting one certificate at a time, a CA can simplify the process by distributing digital certificates to a requesting client in a batch using the PKCS #7 specifications. While in transport, an encrypted PKCS #7 file can protect a private key associated with the digital certificate. The PKCS #7 file may then be stored at the client premises until it is needed. When needed, it is taken out of the database and decrypted, and then the certificate can be applied to the associated user or device.

Currently, a client uses one or more Hardware Security Modules (HSMs) to retrieve a key (e.g., an Advanced Encryption Standard (AES) key). Since the usage of HSMs is expensive, some clients opt to use cloud-based HSMs. In this case, they communicate through a network to retrieve the key and then use that key to decrypt one PKCS #7 file to obtain the digital certificate, which in turn can then be applied to a corresponding electronic device for authenticating that device. However, this process can be expensive and time-consuming since multiple calls the remote HSMs are made. At the same time, it can be expensive to have one or more HSMs at the client premises. Usually, a new symmetric key (e.g., AES key) is used for each electronic device. Thus, if multiple digital certificates are meant to be applied to multiple electronic devices, multiple calls to the HSMs would be needed to retrieve each of the symmetric keys. Therefore, there is a need in the field of cryptography to simplify this process and reduce costs of retrieving symmetric keys.

BRIEF SUMMARY

The present disclosure is directed to cryptographic systems and methods for enabling a client to request multiple digital certificates in a batch, wherein a server may receive the request and encrypt a single symmetric key that can be used to decrypt multiple certificate packages containing the digital certificates. In one implementation, a server may include a processing device and a memory device configured to store computer code having instructions that enable the processing device to perform certain steps. The processing device may be configured to generate a plurality of key pairs in response to receiving a request from a client for one or more of digital certificates, wherein the key pairs are associated respectively with the one or more digital certificates, and wherein each key pair includes a public key and a private key. Furthermore, the processing device may be configured to utilize at least the plurality of key pairs to generate the one or more digital certificates. Also, the processing device can encrypt the one or more digital certificates and respective private keys using a single Advanced Encryption Standard (AES) key and send the encrypted one or more digital certificates and private keys back to the client.

According to additional embodiments, the step of sending the encrypted one or more digital certificates and private keys may include the step of creating a plurality of Public-Key Cryptography Standard 7 (PKCS #7) files, wherein each PKCS #7 file includes a corresponding digital certificate and key pair, and wherein the single AES key is configured to decrypt each PKCS #7 file. The step of using the single AES key for the one or more digital certificates may allow the client to decrypt the single AES key one time to enable the decryption of each of the encrypted one or more digital certificates.

Also, the server may further comprise a trust manager configured to receive the request and generate the key pairs and a certificate management system configured to generate and encrypt the one or more digital certificates. The request for the one or more digital certificates may be a request for digital certificates to be applied to a plurality of electronic devices. For example, the one or more digital certificates may be applied to the plurality of electronic devices during a predetermined timeframe when the electronic devices are manufactured. Also, the step of generating the one or more digital certificates further may include utilizing a Certificate Signing Request (CSR) generated along with the generation of the plurality of key pairs.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 3 is a flow diagram illustrating a method for performing the operations of the system of FIG. 1, according to various embodiments.

FIG. 4 is a flow diagram illustrating a method associated with functionality of the server shown in FIG. 1, according to various embodiments.

FIG. 5 is a flow diagram illustrating a method associated with functionality of the user device shown in FIG. 1, according to various embodiments.

DETAILED DESCRIPTION

Figure 1:
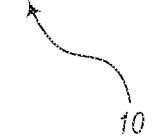
FIG. 1 is a diagram illustrating a system for generating and encrypting certificates and for creating a key for decrypting one or more Public Key Cryptography Standard (PKCS) files, according to various embodiments.

The present disclosure relates to systems and methods for encrypting digital certificates along with corresponding private keys. In particular, the embodiments of the present disclosure are configured to simplify the decrypting of Public-Key Cryptography Standard 7 (PKCS #7) files that store encrypted certificates. Particularly, instead of using one Advanced Encryption Standard (AES) key (or other suitable type of symmetric key) for encrypting a single PKCS #7 file (or one certificate), the same AES key can be used for encrypting (and decrypting) a "batch" of PKCS #7 files (i.e., a plurality of digital certificates) as week as a single certificate. Thus, when the one or more digital certificates are to be retrieved from a database, a single call to a Hardware Security Module (HSM) to obtain the AES key can be made. By obtaining this AES, the one or more digital certificates can be accessed and then used as needed, such as applying the digital certificates to a plurality of electronic devices (e.g., during a manufacturing process).

Currently, when a client retrieves the PKCS #7 keys, an HSM is needed in order to decrypt them (as they are encrypted with a symmetrical AES key). The problem with this is that it is expensive as HSMs are costly to run and it is not particularly high performance due to the use of a new symmetric AES key every time. Therefore, the embodiments of the present disclosure are configured to use the same AES key to encrypt multiple PKCS #7 files. This could be used for batch issuance of certifications as well. The client will then have to only decrypt one key on an HSM. Afterwards, they will be able to work in a more high-performance and cost-efficient manner, while maintaining strong end-to-end data encryption.

A Certificate Authority (CA) (e.g., DigiCert, the Applicant of the present application) is basically configured to issue certificates for identifying users, devices, websites, etc. A PKCS #7 file can be used to transport a certificate from the CA to the requester (or client). PKCS #7 is encrypted with a private key and can provide a secure way to protect the private key associated with the certificate while in transport. The PKCS #7 file is sent to the client, where it might be stored (e.g., in a database) for a certain length of time until later when it is needed. When needed, the PKCS #7 file can be taken out of the database, decrypted, and then used.

PKCS #7 files are used in cryptography as a standard syntax for storing signed and/or encrypted data. The PKCS #7 file is a binary certificate package used to distribute one certificate or even a batch of certificates. Most commercial CAs might return multiple requested certificates using the PKCS #7 format as a convenience rather than distributing certificates individually. When used for distribution purposes, the PKCS #7 package as a whole is neither signed nor encrypted. As with the single binary certificate, the PKCS #7 package does not contain any private keys.

Thus, the conventional approach is that each PKCS #7 file is encrypted with a single, unique key. Suppose, for example, that a client is a manufacturer that intends to manufacture a plurality of electronic devices (e.g., smart phones, IoT devices, laptops, etc.) during a certain time period. If the client intends to manufacture many products (e.g., thousands) throughout a timeframe (e.g., one week), they will normally be required to get a certificate for each device. To do this, they would have to first decrypt a key (e.g., AES key) from an HSM and then use that key to decrypt the PKCS #7 file.

The single, unique key would need to be stored securely in the HSM. Since there is a considerable IT cost for managing on-site HSMs, some clients may use cloud-based HSM services. Either way, with thousands of units to be manufactured, thousands of HSM calls would be needed, resulting in a large usage of IT management resources and a large expense. If the client tries to use one or more remote HSMs, there can be issues when there are network connectivity problems. That is, if the client cannot communicate with the remote HSMs to obtain the key, the manufacturing line could not continue at a steady pace.

A HSM, for example, is a physical computing device that safeguards and manages secrets (e.g., keys). The HSM also performs encryption and decryption functions for digital signatures, authentication, and other cryptographic functions. The core of the HSM may include a plug-in card, a crypto processor chip, etc.

Therefore, the embodiments of the present disclosure are configured to provide a simple solution to overcome the conventional issues with HSM. For instance, the systems and methods of the present disclosure are configured to use one private key to encrypt a batch of PKCS #7 files. It may be noted that a "batch" can represent any number of entities (e.g., electronic devices, users, IoT devices, websites, etc.) and can also represent any time period. In one example, a manufacturer may wish to request a batch of digital certificates for 5,000 IoT devices being manufactured during a time period that lasts for five days. The batch size and duration may be variable and can be dictated by the client.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a system 10 for generating and encrypting certificates and for creating a key for decrypting one or more Public Key Cryptography Standard (PKCS) files. The system 10 may be part of a cloud network having at least a client premises 12 and a server 14 (e.g., cloud-base server). The client premises 12 may include at least a user device 16 (e.g., computer), a database 18 in communication with the user device 16, and a Hardware Security Module (HSM) 20. The server 14 may include at least a trust manager 24 (e.g., DigiCert One platform) and a certificate management system 26 (e.g., Certificate Authority (CA)).

In operation, a client may use the user device 16 to request one or more certificates from the server 14. The trust manager 24 generates a public key and private key (i.e., key pair) for each certificate. Also, the trust manager 24 generates a Certificate Signing Request (CSR) associated with the user request. The key pairs and CSR are forwarded to the certificate management system 26. With respect to each certificate, the certificate management system 26 is configured to use the key pair and CSR to create a digital certificate authenticating a user or device for which the certificate is requested. Also, the certificate management system 26 and/or the trust manager 24 are configured to encrypt the private key and certificate. In some embodiments, the associated public key is not encrypted at this point. Then, for each certificate, the encrypted private key and certificate is sent back to the user (client), which may use PKCS #7.

At the client premises 12, the user device 16 may be configured to store the PKCS #7 file in the database 18. The PKCS #7 file again may include multiple certificates and may include the associated key pairs for each certificate, whereby, for each certificate, the private key and the certificate itself may be encrypted. When a certificate is needed and is meant to be applied to a user or network device, the PKCS #7 file can be retrieved from the database 18 and supplied to the HSM 20. The HSM 20 is configured to decrypt the PKCS #7 file and retrieve an Advanced Encryption Standard (AES) key. Using the AES key, the user device 16 can decrypt the PKCS #7 file to retrieve the key pairs and certificates.

According to the embodiments of the present disclosure, the system 10 is configured to use the same AES key to encrypt multiple PKCS #7 files, which could be used to contain multiple certificates and associated key pairs. Thus, the server 14 may be configured to send one or more certificates and key pairs in the PKCS #7 files and then the user can retrieve the one or more certificates using a single AES key. Thus, the HSM 20 only needs to decrypt one AES key for the client's batch and the client can then apply multiple certificates to multiple devices (or users). The AES key may be a symmetric key where the same algorithm is used for encryption and decryption.

In a manufacturing setting, for example, suppose the client premises 12 includes a scenario where thousands of electronic network devices (e.g., mobile phones, IoT devices, etc.) are being produced. Instead of requesting the AES key from the HSM 20 for each mobile phone being produced (i.e., thousands of requests), the client would only need to request the one common AES key for the batch of mobile phones. Using the AES key, the client can then retrieve the one or more certificates and apply them to each mobile phone as they are being manufactured. Therefore, instead of thousands of HSM 20 requests, only one request is needed for the entire batch. This allows the client to operate in a high performance and cost efficient manner, while also maintaining a strong end-to-end data encryption process. The system 10 allows the ability to programmatically use the same AES key in the certificate management system 26 in order to encode multiple PKCS #7 files.

The trust manager 24 pre-generates the keys, not on the devices themselves, but securely on the server 14 for encryption before sending to the client premises 12. The keys may be the public keys and private keys of the key pair as well as a single AES key. In some cases, the private key is the same as the AES key. Then, the user device 16 receives the encrypted keys and stores them in the database 18. The keys may be stored in the database 18 for some amount of time before it can be provisioned to the device.

It may be noted that the end state of the private key is not necessarily the PKCS #7 formatted encrypted data. Before it is applied to the device, or when it is being provisioned to the device, it is taken out of the PKCS #7 encrypted form and decrypted. The embodiments of the present disclosure are configured to improve upon the situation where the PKCS #7 file is stored in the database 18 in that format, but then is decrypted and the private key extracted from it. At this point, the decrypted certificate and public key can be presented to the device, not in the PKCS #7 format, but as a clear decrypted private key. Again, the decryption of each of the multiple PKCS #7 files can be done when a single symmetric key (e.g., AES key) is used for a batch of certificate packages, the batching controlled by the client when the request is made. For example, if the client request 3,000 certificates for 3,000 mobile phones over the next week, then the single AES key can be used for the generated batch of 3,000 certificates, thereby reducing the number of calls to an HSM (e.g., HSM 20) from 3,000 down to one.

In this case, it is beneficial to have a single HSM 20 at the client premises 12 such that calls to the HSM 20 will not be affected by connectivity issues with the server 14. In other words, whether multiple calls are made or even just a single call is made, the client can take advantage of the simplified HSM calling process by having the HSM 20 on site. Nevertheless, even if the client does not have an HSM on site, the client can still make a single HSM call to a remote site (e.g., server 14) to obtain the single AES key, and thereafter can use the AES key for decrypting the multiple certificate packages as needed.

Normally, an HSM may have fully independent keys when the PKCS #7 file is unique each time. It would therefore take a lot of overhead to decrypt each one before the client can get the private key out and present it to the device. However, the embodiments of the present disclosure overcome this issue of excessive overhead costs. In one embodiment, a "batch" may represent one deployment (of devices) per PKCS #7 file. It may be noted, however, that the private key issued by the trust manager 24 may still be unique for each device. The encryption (represented by the numeral 4 in FIG. 1), however, may include another layer of encryption where a symmetric key (e.g., AES key) can be used for encryption at this point as well as decryption by client at a later time when the certificates are to be provisioned to the devices. Thus, the symmetric key that is used to encrypt each PKCS #7 file (or certificate package) is the same for each file or package. Also, the process causes each one of those files to be encrypted with the same symmetric key, which allows the client to use that same symmetric key when they are ready to decrypt the PKCS #7 files. Then, when the client wants to extract the private keys on the manufacturing line, they do not have to get that unique symmetric key for every single file, but would only need to get the one symmetric key to decrypt all of the PKCS #7 files.

The parameters of the "batch" can be controlled by the client. That is, they may wish to enter a certain batch size, which can be variable for the customer. Also, the client can control how long of a time the symmetric key can be used. For security issues, the symmetric key will not be applicable indefinitely. Thus, for provisioning a number of devices over a certain timeframe, one symmetric key can be used. Then, when a next batch of devices are to be provisioned with certificates, a new singular symmetric key can be created.

This process may be applicable to those scenarios where the manufacturing line does not want to rely upon their Internet connection for manufacturing every single device and thereby mitigating a risk of downtime to manufacturing. The client, however, may have to weigh the risk of using the same symmetric key for some extended amount of time versus the risk of manufacturing downtime.

Again, the client calls out to the trust manager 24 to ask for a certain number of certificates and private keys. The server 14 generates the private keys and certificates on the server side. The trust manager 24 can create a single AES key for the batch. Once the trust manager 24 receives the associated certificates from the certificate management system 26, it can encrypt the entire batch of multiple private keys and certificates with the single AES key. If the client asks for 10,000 certificates in a batch, for example, the server 14 can use the same AES key to encrypt each one of the private keys as a PKCS #7 formatted file. In a sense, each file is dually encrypted (i.e., two layers of encryptions). The first is that the AES key encrypts the symmetric key. The second is that the certificate encrypts the AES key. When they're done, the client has a PKCS #7 file that has the AES key and the private key both encrypted therein. The first step they might take is to decrypt the symmetric key using the private key of a certificate. Then, they can use the AES key to decrypt the private key out of that file.

The benefit is that the client only needs to call out to some sort of HSM, or call out to that private key of their certificate, a single time to decrypt the AES key for the first of their private keys in the batch. From there on, the client could then use that decrypted AES key to decrypt the rest of their private keys in the batch. That is, they do not have to call out to the encryption certificate's private key every single time for every PKCS #7 file. They can just get the initial symmetric key from the first of their batch files and then use it for the rest of the batch.

The server 14 gives the customer back the certificate, and then gives them back an encrypted private key in the PKCS #7 format. For example, if 10,000 certificates are requested, the server 14 sends the client 10,000 PKCS #7 files, 10,000 certificates, and one AES key. Also, the same AES key can be repeated in each one of those PKCS #7 files. The benefit of this is that each one of those files has the same AES key encrypted in it that the client can use to get the encrypted certificate and private key by decrypting any one of them.

Let's say in a manufacturing process, a client has 10,000 devices they need to provision for a week. At the start of the week, they may start up the process and decrypt one of the files using the private key of the encryption certificate. With this one decrypted, they can have the symmetric key in memory of their provisioning server at the client premises 12 and they can work through their manufacturing for the week. If at any point during the week they reset the service, for whatever reason, then the client may then go and get that private key of the encryption certificate, decrypt any one of the next private keys in the list and pull the symmetric key again. They can pull that symmetric key out and put it in memory again. Then, they can decrypt the rest of their keys as long as that service doesn't get restarted and the key is not lost out of memory. That symmetric key can be used to decrypt the rest of the batch.

Therefore, some of the benefits of the system 10 are the reduction in manufacturing downtime and reduced HSM usage. With regard to reduced HSM usage, the conventional systems encrypt every single one of the PKCS #7 files with its own symmetric key. This has been implemented in manufacturing for years, where every time the client needs to decrypt one of the keys, they are using a unique key, not the same symmetric key. In this conventional manner, they would call out to an HSM where the private key of their encryption certificate is stored. Hence, every single decryption would be through calling out to the HSM every time. What they may need in that case would be multiple redundant HSMs on the premises within their manufacturing line in order to reduce downtime in their manufacturing line. In some cases, they may wish to have redundant HSMs in the cloud, because they may have multiple manufacturing lines running at a time. This of course can be very expensive.

Also, having expertise on their manufacturing lines would be difficult to maintain, because if something goes wrong with the HSM or the network there, they may want to have people that know how to manage those HSMs. Therefore, in addition to, say, three HSMs for their manufacturing line, they may also need people with expertise in managing those HSMs. Thus, even though there may be a desire to eliminate on-premises HSMs, they may move to using HSM services on the cloud. However, if they are still calling out to the HSM 10,000 or more times per week, this means for every single one of these manufactured devices, the client would need to call out to a cloud HSM, which can result in excessive service costs. But if the connectivity goes down, the client cannot manufacture anymore.

Figure 2:
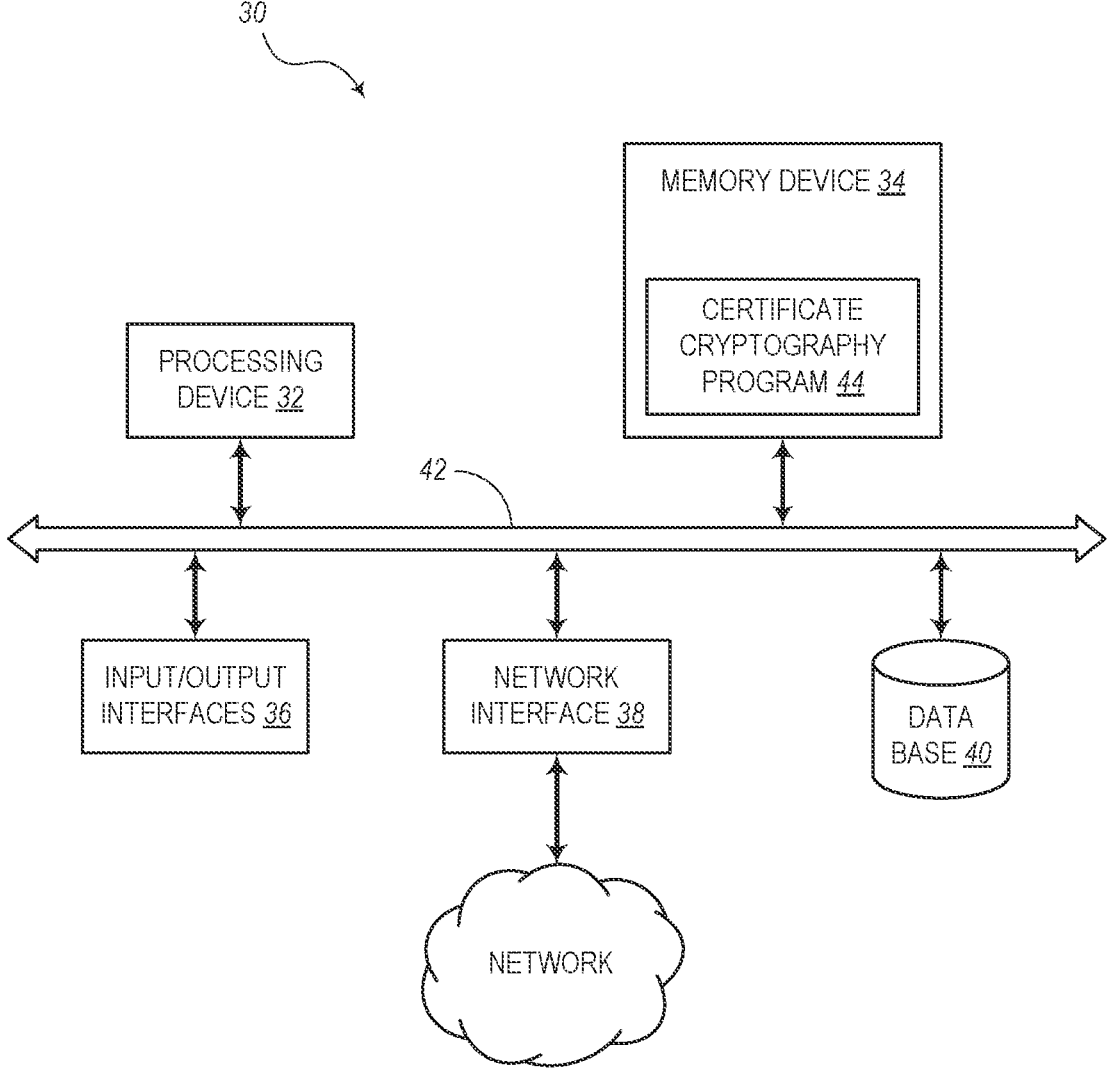
FIG. 2 is a block diagram illustrating a computing system representing the trust manager, certificate management system, user device, and/or Hardware Security Module (HSM) shown in FIG. 1, according to various embodiments.

FIG. 2 is a block diagram illustrating an embodiment of a computing system 30 representing the user device 16, HSM 20, trust manager 24, and/or certificate management system 26 shown in FIG. 1. Although each of the user device 16, HSM 20, trust manager 24, and certificate management system 26 includes specific operations according to their respective roles in the system 10, the computing system 30 is configured to work with the other devices (e.g., represented by their own computing systems) to encrypt and decrypt certificates and key pairs as described in the present disclosure.

In the illustrated embodiment, the computing system 30 may be a digital computing device that generally includes a processing device 32, a memory device 34, Input/Output (1/O) interfaces 36, a network interface 38, and a database 40. It should be appreciated that FIG. 2 depicts the computing system 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

In addition, the computing device 30 includes a certificate cryptography program 44, which may be implemented in any suitable form of hardware (in the processing device 32) and/or software (in the memory device 34). The certificate cryptography program 44 may be configured, for example, in a non-transitory computer-readable medium and may include computer logic or code. The computer logic or code may include instructions or commands configured to enable the processing device 32 to perform certain functionality as described in the present disclosure, such as the functionality described with respect to FIG. 3.

FIG. 3 is a flow diagram illustrating an embodiment of a method 50 for performing the operations of the system 10 of FIG. 1. The method 50 is a cache encryption (or database encryption) process using a single symmetric key (e.g., AES key). On the client side, the method 50 includes the step where a client requests a certificate to be generated with server-side key generation, as indicated in block 52. The request, for example, may be for a batch of certificates for a plurality of devices. Also, the request may include information that can be used for creating a Certificate Signing Request (CSR).

On the server side, the method 50 further includes the step where a trust device (e.g., trust manager 24) generates a public and private key pair (e.g., for each certificate) along with a CSR and passes the key pairs and CSR to a CA (e.g., certificate management system 26), as indicated in block 54. The CA then generates a certificate utilizing the CSR information and private and public key pair, as indicated in block 56. The method 50 then includes the step where the CA (or trust device) encrypts the private key and certificate, as indicated in block 58. Next, the method 50 includes the step of sending the encrypted private key and certificate to the client, as indicated in block 60.

On the client side, the method 50 further includes the step where an HSM (e.g., HSM 20) is used to decrypt the data and retrieve an AES key, as indicated in block 62. The AES key may be provided to the HSM during a prior process and may be related to the encrypting step associated with block 58. Next, the HSM retrieves the AES key that is used for encryption, as indicated in block 64. The decrypted data can then be retrieved and sent back to the client, as indicated in block 66.

The method 50 may include the flow of a single certificate issuance. For each certificate generated, the HSM would have to be used to retrieve the AES key used for encryption. However, by caching the AES key in a database, the method

50 could perform the step of retrieving the AES key only one time, and the AES key could be used throughout the duration of a predetermined time period (e.g., during the manufacture of a specific number of electronic devices, during a certain manufacturing timeframe, etc.).

In particular, the AES key is a symmetric key using a specific encryption algorithm, which means the same secret key can be used for both encryption and decryption. This efficiency makes it well-suited for encrypting large amounts of data quickly.

To use AES for encryption, a key can be generated using a secure random number generator. The length of the key determines the AES variant to be used. For example, the AES may have a length of 128 bits, 192 bits, or 256 bits.

To retrieve the private key, the AES key (which was used for its encryption) can then be used for decryption. This is where the HSM can be used. The encrypted private key can be sent to the HSM beforehand, along with the necessary authentication and authorization credentials. The HSM is then configured to use its cryptographic capabilities to decrypt the AES key that was used to encrypt the private key. This decryption happens securely within the HSM's hardware-protected environment. Once the AES key is decrypted, it can be used to decrypt the private key itself. The decrypted private key can then be returned to the client's application on the user device 16.

According to one example use case, a client could use the same AES key to encrypt multiple PKCS #7 files, which, according to various embodiments, may be a) certificate+private key, b) certificate only, or c) private key only. This could be useful where multiple certificates are issued at once in a batch. The client may then retrieve the AES key for encryption one time for the duration of the cache period. Afterwards, the client will be able to work in a more high-performance and cost-efficient manner, while maintaining strong end-to-end data encryption.

FIG. 4 is a flow diagram illustrating an embodiment of a method 70 associated with functionality of a cloud-based security service system (e.g., server 14) or Public Key Infrastructure (PKI). For example, the security service system may be a Certificate Authority (CA) or may be configured to operate with a CA for creating certificates. In some embodiments, the system may be coordinated with a client device for performing cryptography and caching of certificates and key pairs and for enabling the client device to make a single request to an HSM for obtaining an AES key that can be used to decrypt multiple PKCS #7 files of multiple certificates. Specifically, the server system may be configured to push software or firmware updates to the clients to enable them to utilize the functionality of simplifying the HSM interactions.

As shown in FIG. 4, the method 70 includes the step of generating a plurality of key pairs in response to receiving a request from a client for one or more digital certificates, as indicated in block 72. The key pairs are associated respectively with the one or more digital certificates, wherein each key pair includes a public key and a private key. The method 70 further includes the step of utilizing at least the plurality of key pairs to generate the one or more digital certificates, as indicated in block 74. Also, the method 70 includes the step of encrypting the one or more digital certificates and respective private keys using a single Advanced Encryption Standard (AES) key, as indicated in block 76. The method 70 also includes sending the encrypted one or more digital certificates and private keys back to the client, as indicated in block 78.

In some embodiments, the step of sending the encrypted one or more digital certificates and private keys (block 78) may include the step of creating a plurality of Public-Key Cryptography Standard 7 (PKCS #7) files. For example, each PKCS #7 file may include a corresponding digital certificate and key pair, wherein the single AES key may be configured to decrypt each PKCS #7 file.

The step of using the single AES key for the one or more digital certificates (block 76) allows the client to decrypt the single AES key one time to enable the decryption of each of the encrypted one or more digital certificates. The method 70 may be performed by a server (e.g., server 14 shown in FIG. 1), where the server may include a trust manager configured to receive the request and generate the key pairs. The trust manager may be configured to generate public key and private key for each "entity" for which certification is requested. The trust manager can also generate a CSR. In some embodiments, the server may further comprise a certificate management system configured to generate and encrypt the one or more digital certificates.

The request for the one or more digital certificates (block 72) may be a request for digital certificates to be applied to a plurality of electronic devices. The one or more digital certificates may be applied to the plurality of electronic devices during a predetermined timeframe when the electronic devices are manufactured. The step of generating the one or more digital certificates (block 74) may further include utilizing a Certificate Signing Request (CSR) generated along with the generation of the plurality of key pairs. The method 70 may further include receiving information about the client, devices, etc., which can then be used for creating the CSR.

The step of receiving the request for multiple digital certificates (block 72) may include applying or provisioning the certificates on multiple client-related entities (e.g., electronic devices, users, websites, etc.). For example, the multiple client-related entities may include one or more devices in the process of being manufactured. Also, receiving the request may include receiving instructions from a client regarding the multiple certificates that are intended to be bundled together and how the multiple certificates are respectively applicable to a related group of entities.

FIG. 5 is a flow diagram illustrating an embodiment of a method 90 associated with functionality of the user device 16 shown in FIG. 1. The method 90, according to the illustrated embodiment, includes the step of sending a request to a server for one or more digital certificates associated with a Certificate Authority (CA), as indicated in block 92. The method 90 further includes the step of receiving a plurality of files from the server, where each file corresponds to a respective digital certificate, as indicated in block 94. Also, each file includes encrypted data containing at least the digital certificate and a corresponding private key. The multiple files are encrypted using a single Advanced Encryption Standard (AES) key. Furthermore, the method 90 includes the step of calling a Hardware Security Module (HSM) to retrieve the single AES key in a single procedure, as indicated in block 96. The method 90 also includes utilizing the single AES key to decrypt the plurality of files, as indicated in block 98.

In some embodiments, the method 90 may further comprise the step of provisioning each of a plurality of entities with a corresponding digital certificate. Also, the entities described herein may include one or more groups of electronic devices, IoT devices, mobile phones, users, websites, etc. The step of provisioning each entity with the corresponding digital certificate may include provisioning the corresponding digital certificates during a predetermined timeframe.

The method 90, according to additional implementations, may include the step of storing the files in a database. The files, for example, may be Public-Key Cryptography Standard 7 (PKCS #7) files. The step of calling the HSM (block 96) may include a single call, wherein the symmetric key may be an Advanced Encryption Standard (AES) key, and wherein the HSM may reside in a client premises.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A server comprising:
   a processing device; and
   a memory device configured to store computer code having instructions that enable the processing device to perform the steps of
      generating a plurality of key pairs in response to receiving a request from a client for one or more digital certificates, the plurality of key pairs associated respectively with the one or more digital certificates, wherein each key pair includes a public key and a private key,
      utilizing at least the plurality of key pairs to generate the one or more digital certificates,
      encrypting the one or more digital certificates and respective private keys using a single Advanced Encryption Standard (AES) key, and
      sending the encrypted one or more digital certificates and private keys back to the client.

2. The server of claim 1, wherein the step of sending the encrypted one or more digital certificates and private keys includes the step of creating a plurality of Public-Key Cryptography Standard 7 (PKCS #7) files, wherein each PKCS #7 file includes a corresponding digital certificate and key pair, and wherein the single AES key is configured to decrypt each PKCS #7 file.

3. The server of claim 1, wherein the step of using the single AES key for the one or more digital certificates allows the client to decrypt the single AES key one time to enable decryption of each of the encrypted one or more digital certificates.

4. The server of claim 1, further comprising a trust manager configured to receive the request and generate the key pairs.

5. The server of claim 1, further comprising a certificate management system configured to generate and encrypt the one or more digital certificates.

6. The server of claim 1, wherein the request for the one or more digital certificates is a request for digital certificates to be applied to a plurality of electronic devices.

7. The server of claim 6, wherein the one or more digital certificates are applied to the plurality of electronic devices during a predetermined timeframe when the electronic devices are manufactured.

8. The server of claim 1, wherein the step of generating the one or more digital certificates further includes utilizing a Certificate Signing Request (CSR) generated along with the generating of the plurality of key pairs.

9. A non-transitory computer-readable medium configured to store computer logic having instructions that enable a processing system to:

generate a plurality of key pairs in response to receiving a request from a client for one or more digital certificates, the plurality of key pairs associated respectively with the one or more digital certificates, wherein each key pair includes a public key and a private key, utilize at least the plurality of key pairs to generate the one or more digital certificates, encrypt the one or more digital certificates and respective private keys using a single Advanced Encryption Standard (AES) key, and send the encrypted one or more digital certificates and private keys back to the client.

10. The non-transitory computer-readable medium of claim 9, wherein sending the encrypted one or more digital certificates and private keys to the client further includes creating a plurality of Public-Key Cryptography Standard 7

(PKCS #7) files, wherein each PKCS #7 file includes a corresponding digital certificate and key pair, and wherein the single AES key is configured to decrypt each PKCS #7 file.

11. The non-transitory computer-readable medium of claim 9, wherein using the single AES key for the one or more digital certificates allows the client to decrypt the single AES key one time to enable decryption of each of the encrypted one or more digital certificates.

12. The non-transitory computer-readable medium of claim 9, wherein the instructions further enable the processing system to use a trust manager to receive the request and generate the key pairs and use a certificate management system to generate and encrypt the one or more digital certificates.

13. The non-transitory computer-readable medium of claim 9, wherein the request for the one or more digital certificates is a request for digital certificates to be applied to a plurality of electronic devices, and wherein the one or more digital certificates are applied to the plurality of electronic devices during a predetermined timeframe when the electronic devices are manufactured.

* * * * *